Jan. 22, 1946.  R. S. SEGSWORTH  2,393,479
VARIABLE SPEED HYDRAULIC TRANSMISSION
Filed Sept. 23, 1944  4 Sheets-Sheet 2

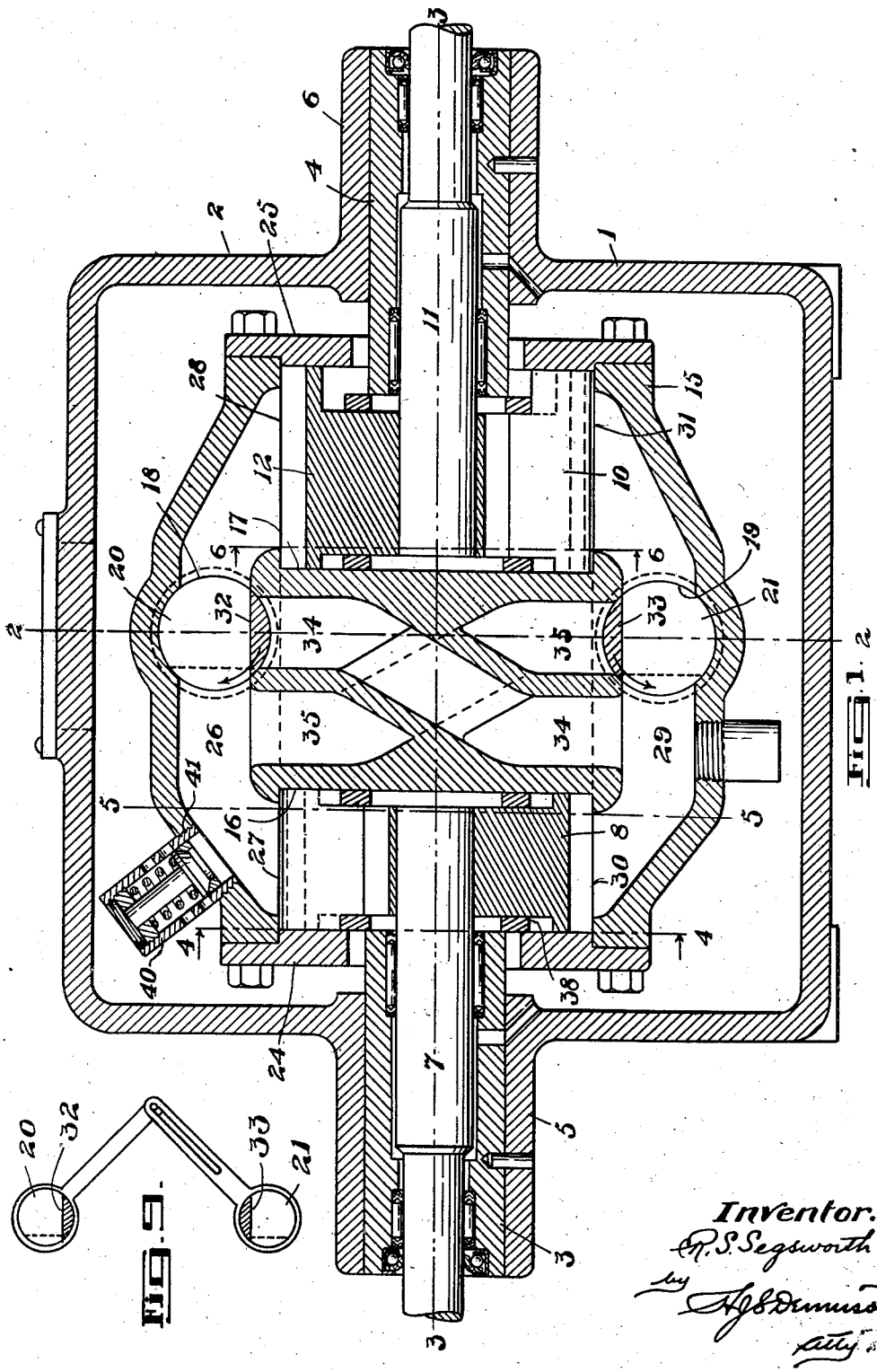

Inventor.
R. S. Segsworth
by
H. J. S. Dennison
atty.

Jan. 22, 1946.   R. S. SEGSWORTH   2,393,479
VARIABLE SPEED HYDRAULIC TRANSMISSION
Filed Sept. 23, 1944   4 Sheets-Sheet 3

Inventor.
R. S. Segsworth

Jan. 22, 1946. R. S. SEGSWORTH 2,393,479
VARIABLE SPEED HYDRAULIC TRANSMISSION
Filed Sept. 23, 1944 4 Sheets-Sheet 4

Inventor
R. S. Segsworth
by
[signature]
atty.

Patented Jan. 22, 1946

2,393,479

UNITED STATES PATENT OFFICE 2,393,479

VARIABLE-SPEED HYDRAULIC TRANSMISSION

Robert S. Segsworth, Toronto, Ontario, Canada, assignor to The General Engineering Company (Canada) Limited, Toronto, Ontario, Canada Application September 23, 1944, Serial No. 555,535

6 Claims. (Cl. 60—53)

This invention relates to hydraulic transmissions in which the driven member may be operated through a fluid medium at speeds variable in relation to the speed of the driving member, and the principal object is to provide a transmission in which the load is constantly connected with the driving power and the speed of operation of the driven member may be varied from zero to maximum by the simple adjustment of a single member.

A further object is to devise an extremely simple and rugged structure in which the operating fluid will flow freely, thereby reducing frictional losses to the minimum and which will require the minimum of attention and will be remarkably easy to control.

The invention consists essentially of a pair of vane type rotors mounted on parallel but longitudinally offset axes, a cylinder enclosing both of said rotors and engaging the vanes thereof and mounted for adjustment in a direction transverse to the axes of said rotors whereby the volumetric displacement per revolution of one rotor is utilized to drive the other rotor in a direct ratio to the relative adjustment of the enclosing cylinder.

In the accompanying drawings

Figure 1 is a longitudial vertical mid-sectional view of a mechanism constructed in accordance with this invention.

Figure 9 is a reduced scale diagrammatic view of the means for reversing the driven member.

Figure 4:
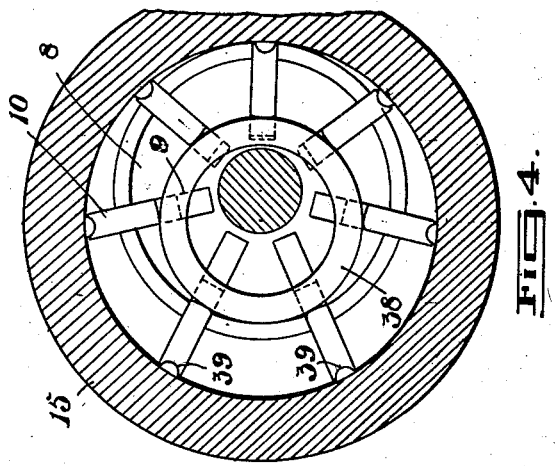
Figure 4 is a vertical elevational section taken on the line 4—4 of Figure 1 through the cylinder and showing the driving rotor.
Figure 2:
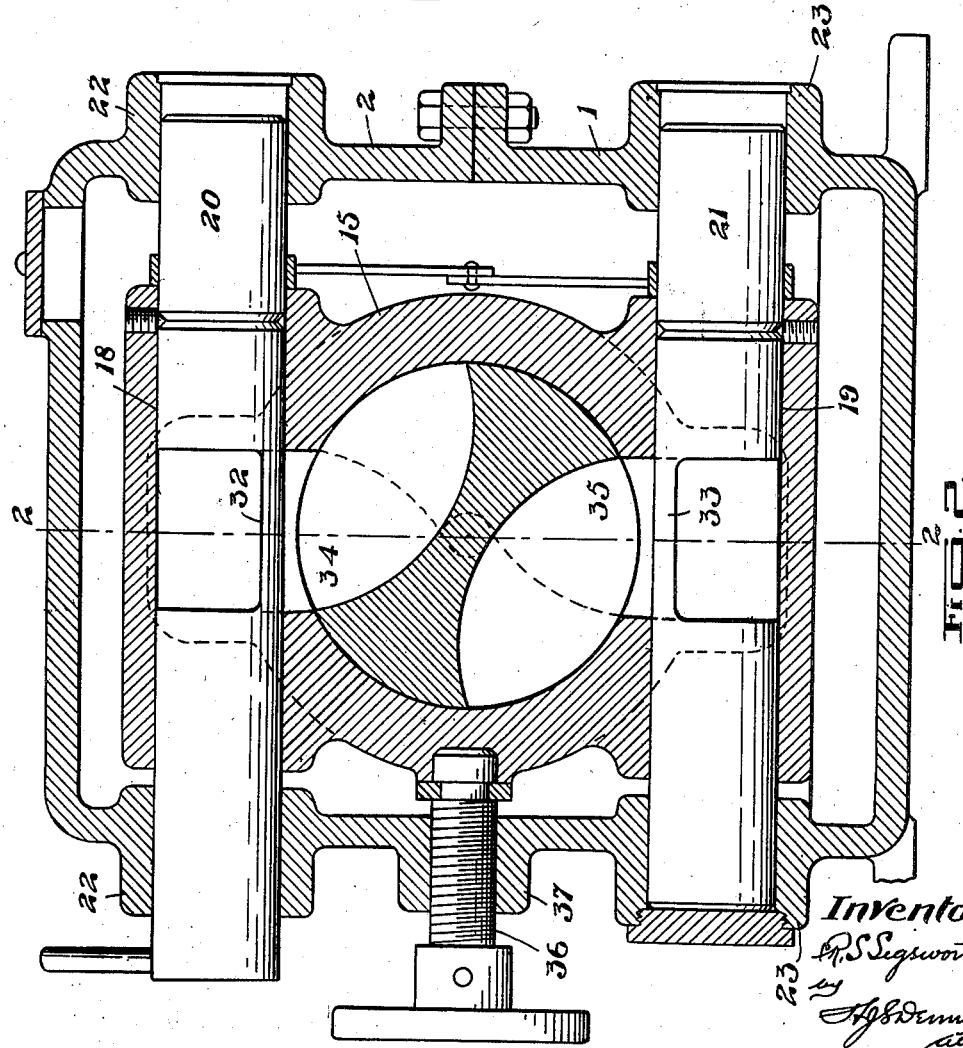
Figure 2 is a vertical transverse section of the mechanism taken on the line 2—2 of Figure 1.
Figure 3:
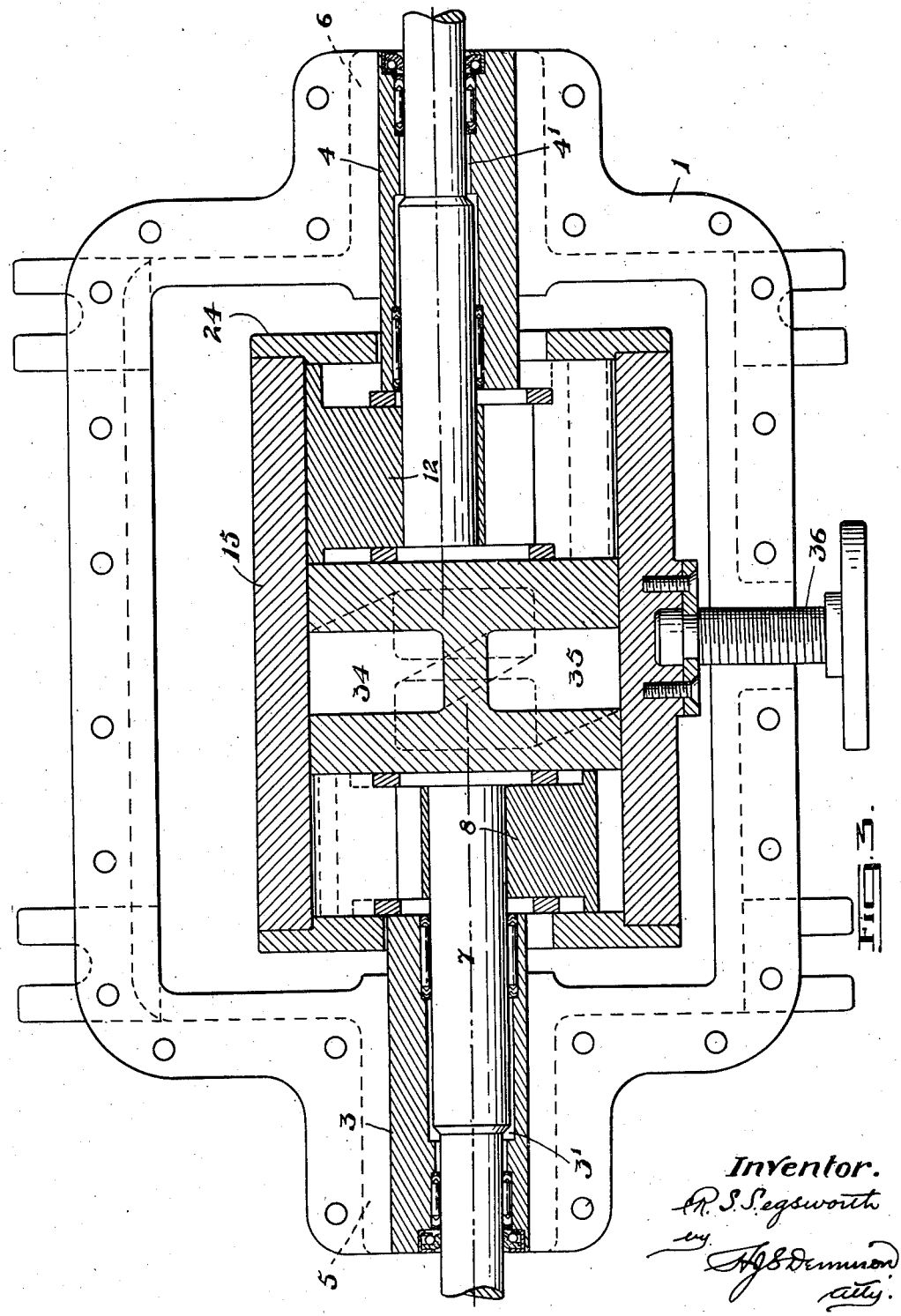
Figure 3 is a horizontal plan section taken on the line 3—3 of Figure 1.

In the form of the invention illustrated in the accompanying drawings the outer casing of the device is formed of a pair of horizontally divided sections 1 and 2 having mating flanges which are suitably bolted together.

Journal bushings 3 and 4 are mounted in bosses 5 and 6 at the opposite ends of the casing and each bushing is formed with an eccentrically arranged bearing orifice 3' and 4' respectively, the axes of which are offset horizontally and are parallel the one to the other. The amount of offset will be regulated in accordance with the duty for which the machine is designed as will hereinafter appear and may be regulated by rotating the bushings in their bosses.

Mounted in suitable bearings in the bushing 3 is the drive shaft 7 which is connected with any suitable source of driving power, and mounted on the inner end of said driving shaft is a cylindrical rotor 8 which is provided with a plurality of radial slots 9 in which are slidably mounted the vanes 10.

The driven shaft 11 journalled in suitable bearings in the bushing 4, the axis of which is horizontally offset from the axis of the driving shaft 7, has mounted on its inner end the cylindrical rotor 12 which is provided with radial slots 13 similar to the slots 9 in the rotor 8, and in which radial vanes 14 are slidably arranged.

A cylinder casing 15, arranged within the outer casing formed by the lower and upper sections 1 and 2, is formed with a pair of co-axial cylindrical chambers 16 and 17 arranged at opposite ends, the chamber 16 forming a housing for the rotor 8 and its radial vanes, and the chamber 17 forming a housing for the driven rotor 12 and its radial vanes.

The cylinder casing 15 is formed with a pair of parallel cylindrical orifices 18 and 19 extending transversely thereof substantially midway of its length and through these orifices extend respectively the cylindrical bars 20 and 21, the ends of which are rotatably mounted in bearing bosses 22 and 23 arranged respectively in the upper and lower casing sections 2 and 1.

End plates 24 and 25 enclose the outer ends of the cylinder chambers 16 and 17 respectively of the cylinder casing 15.

A duct 26 is formed in the upper portion of the cylinder 15 and extends longitudinally thereof between the ports 27 and 28 entering respectively the cylinder chambers 16 and 17

A duct 29 similar to the duct 26 is arranged in the lower half of the casing 15 diametrically opposite to the duct 26 and forms a communicating passage between the ports 30 and 31 respectively of the cylinder chambers 16 and 17.

The ducts 26 and 29 are intersected by the bars 20 and 21 and said bars are cut away to form a continuation of the respective ducts therethrough. The segmental portions 32 and 33 are arranged to close the upper and lower ends of a pair of passages or ducts 34 and 35 which extend transversely through the central portion of the cylinder casing arranged between the cylinder chambers 16 and 17.

The duct 35 opens at the top into the longitudinal duct 26 extending from the cylinder chamber 16 to the chamber 17 and it extends diagonally and opens into the bottom duct 29 extending from the cylinder chamber 16 to the chamber 17. The bottom end of the duct 35 is however closed by the valve portion 33 of the bar 21.

The duct 34 opens at the bottom end into the duct 29 and extends diagonally upward to communicate with the duct 26 but the duct 34 is closed by the valve portion 32 of the bar 20.

The operation of the rotor 8 with its radial vanes within the cylinder chamber 16 is designed to create a flow of a fluid medium such as oil taking it in through the port 30 from the duct 29 and discharging through the port 27 into the duct 26, and this fluid medium flows through the duct 26 and through the port 28 and effects the rotative operation of the rotor 12 and its radial vanes, thereby operating the driven shaft 11.

The cylinder casing 15 and also the outer casing is completely filled with the fluid medium, consequently the ducts 35 and 34 extending transversely through the central portion of the cylinder member are filled. Oil forced into the ducts 26 by the operation of the rotor 8 flows through this duct freely to operate the rotor 12 and the oil entering the port 28 and the cylinder chamber 17 is discharged through the port 31 into the bottom duct 29 and the discharged oil flows back to the driving rotor to the port 30.

The cylinder casing 15 has been described as being slidably mounted upon the bars 20 and 21 and as these bars are arranged transversely of the outer casing the cylinder casing may be moved so that the positions of the rotors mounted on the shafts 7 and 11 respectively will be altered eccentrically of the respective cylinder chambers 16 and 17.

An operating screw 36 threaded in the boss 37 in one of the side walls of the outer casing is rotatably secured at its inner end to the cylinder casing 15 so that upon the rotation of said screw member the cylinder casing will be caused to slide on the bars 20 and 21.

Figure 5:
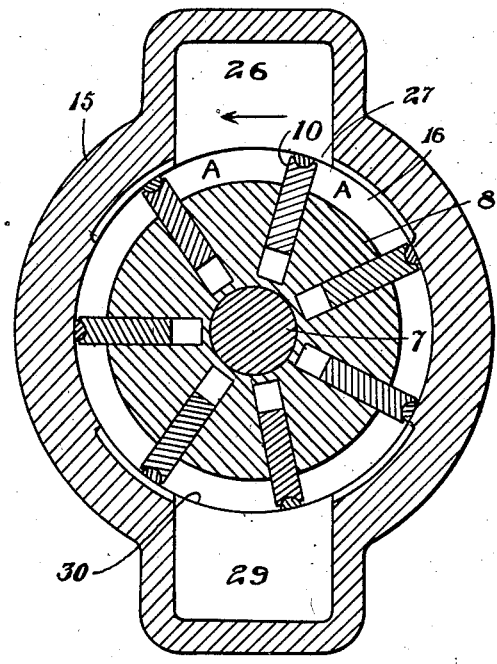
Figure 5 is a diagrammatic vertical section of the driving rotor taken on the line 5—5 of Figure 1 showing the cylinder enclosing the rotor adjusted to the mid-position concentric to the rotor.

When the cylinder casing 15 is adjusted so that the cylinder chamber 16 is in the position illustrated in Figure 5 it will be seen that the rotor 8 is concentric to the cylinder and that the chambers A enclosed by the radial vanes of the rotor are of equal volume. Therefore the motive fluid contained within the cylinder chamber 16 rotates with the rotor and there will be no discharge from the cylinder 16 through the port 27, and there will be no transfer of the motive fluid to the chambers between the vanes of the adjacent rotor 12.

Figure 6:
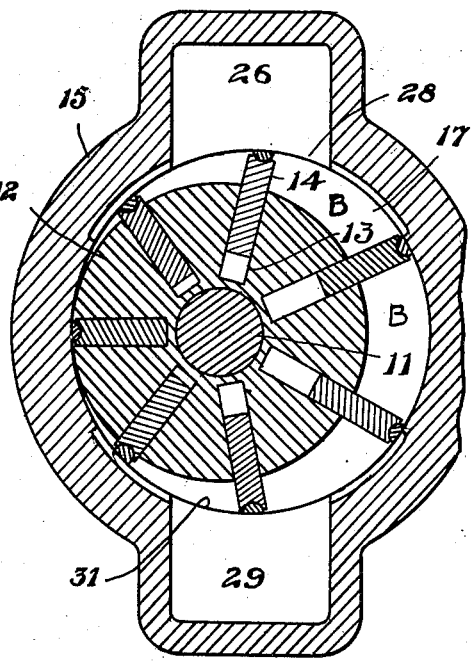
Figure 6 is a diagrammatic vertical elevational section through the line 6—6 of Figure 1 showing the driven rotor and illustrating the relative position of the cylinder to the rotor when said cylinder is in the position illustrated in Figure 5 relative to the driving rotor.

It will be noted that when the rotor 8 is in the concentric position as illustrated in Figure 5 the rotor 12 of the adjacent cylinder will, because of the offset arrangement of the rotor shaft, be positioned in the extreme eccentric position illustrated in Figure 6 relative to the cylinder chamber 17.

By moving the cylinder casing 15 horizontally in the direction of arrow, Figure 5, the cylinder chamber 16 is moved into an eccentric relation to the rotor 8. Consequently the rotation of the rotor and its radial vanes moves the fluid into a diminishing area and the excess is directed through the port 27 to flow through the duct 26. This flow of fluid is under full pressure of the power applied and it enters the cylinder chamber 17 through the port 28. The movement of the cylinder casing 15 to cause discharge from the cylinder chamber 16 changes the relationship of the rotor 12 with its enclosing casing 17, but the flow of pressure fluid into the chambers B between the vanes of the driven rotor causes said rotor to be operated at a speed which is in direct ratio to the speed of the driving rotor.

It will be understood that as the cylinder 15 is moved further in the direction of the arrow in Figure 5 the displacement of the motive fluid per revolution from the chambers A of the rotor 8 is progressively increased, while the displacement capacity per revolution of the chambers B of the rotor 12 are correspondingly decreased, with the result that there will be an increase in flow of fluid from the driving member to the driven member, resulting in an increase in the travel of the driven member in relation to the driving member.

The ratio of increase of output speed will vary in accordance with the movement of the cylinder.

Figure 7:
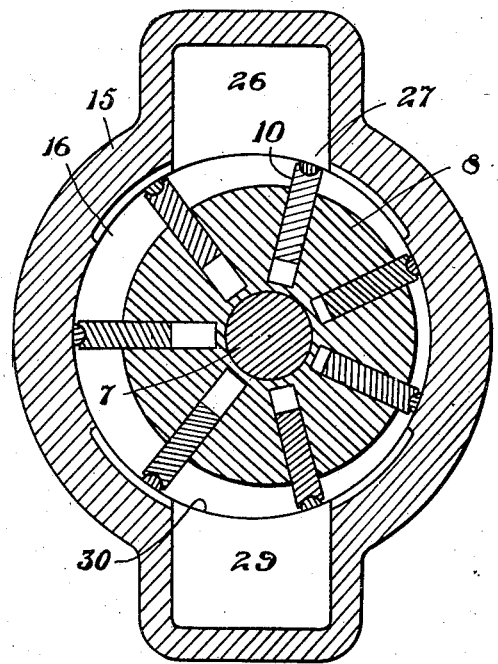
Figure 7 is a view similar to Figure 5 illustrating the cylinder adjusted to a position eccentric to the driving rotor.
Figure 8:
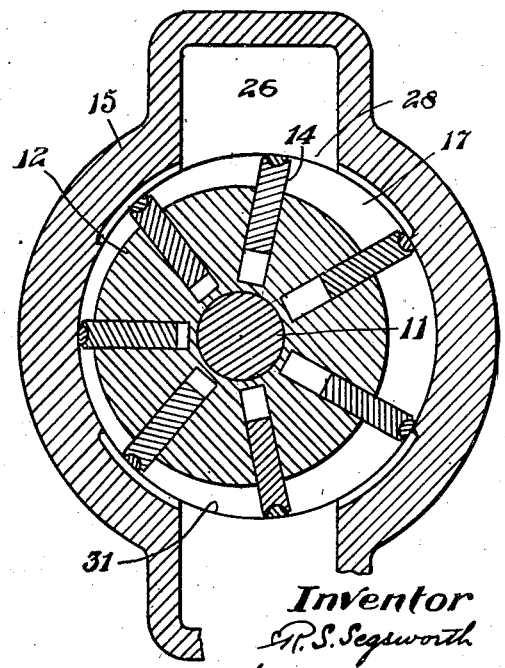
Figure 8 is a view similar to Figure 6 showing the position of the cylinder relative to the driven rotor when the cylinder is in the position relative to the driving rotor illustrated in Figure 7.

When the cylinder casing 15 and the respective rotors are in the position shown in Figures 7 and 8 the discharge per revolution from the driving rotor will be equal to the receiving capacity per revolution of the driven rotor, and the output speed will equal the input speed.

Further movement of the cylinder will create an increased volume per revolution from the driving member and a further reduction per revolution of the receiving capacity of the driven member. Consequently the speed ratio will be raised above the point of equality and the driven member will be operated at an increasingly higher speed than the driving member as the position of the cylinder continues to be changed.

It will be understood that the motive fluid contained in the decreasing volumetric capacity chambers in the driven member is returned to the intake chambers of the driving member as previously described.

The cylinder may be moved from the neutral or zero position to cause a gradual increase in speed ratio for the maximum range of the mechanism and from the maximum back to zero, and the load is at all times directly connected with the applied power.

The device herein described may be operated to drive the driven member in either direction with an equal range of ratio adjustment.

In order to effect reversal of operation of the driven member the bars 20 and 21 are rotated so that the valve portion 32 of the bar 20 will be caused to extend across the duct 26 to shut off the flow of pressure fluid from the driving member to the driven member. Concurrently the valving portion 33 of the bar 21 is moved to close the duct 29. The changed positions of the valves are indicated by dotted lines.

This operation of the bars 20 and 21 closes the duct 26 and opens the duct 35 into the duct 29 so that the pressure fluid flows into the driven cylinder chamber 17 through the port 31 which effects a reversal of operation of the rotor 12.

The discharge fluid flows out through the port 28 and is directed through the cross-over duct 34 to the port 29 entering the inlet port 30 of the driving rotor.

The vanes of each of the respective rotors are recessed at the ends and floating rings 38 engage the shoulders formed by these recesses in slip contact and hold the vanes outwardly with their outer edges in contact with the inner wall of the respective cylinder chambers.

When the machine is in operation centrifugal force holds the vanes outward but the floating rings engaging the shoulders in the ends of the vanes retain the vanes in constant operating contact with the cylinder wall.

In order that effective contact will be maintained between the outward edges of the vanes and the inner surface of the cylinder chamber each of the vanes is preferably formed with a part-circular recess extending from end-to-end thereof in which is mounted a semi-circular shoe 39, the outer surface of the shoe making a uniform contact with the cylinder wall and said shoe having a rotative contact with the vane.

If it is desired to alter the offset of the driving and driven shafts, the bearing bushings, in which the bearings are eccentrically arranged may be rotated in the supporting bosses in the outer casing and the relative rotation will move the respective axes of the driving and driven shafts into closer or farther separated relation thereby altering the relative values between the driving and driven elements.

A transmission device such as described is extremely simple in its construction. It is very rugged and will effectively withstand much abuse. It affords a very wide range of speed transmission from zero to the maximum capacity for which the individual unit is designed.

The connecting ports between the driving and driven members afford a free unthrottled passage of the fluid and a device of very high efficiency is produced.

A relief valve 40 is shown in Figure 1 threaded into an opening 41 leading from the passage 26 to the interior of the outer casing 2.

The rotary valve members shown show a highly desirable means for slidably supporting the cylinder and these valves may be operated in unison by means of suitable gear connections or, as illustrated in Figure 9, one valve may be provided with a radial arm having a pin slidably engaging a slotted radial arm secured to the other valve so that on the rotation of the upper valve to the dotted position shown in Figure 1 will also rotate the other valve to the dotted position.

What I claim as my invention is:

1. A variable speed hydraulic transmission having a pair of vane type rotors mounted on parallel but longitudinally offset axes and a cylinder enclosing both of said rotors and engaging the vanes thereof and mounted for adjustment in a direction transverse to the axes of said rotors whereby the volumetric displacement per revolution of the driving rotor is utilized to drive the other rotor in a direct ratio to the adjustment of the enclosing cylinder, in which the cylinder is provided with a dividing wall intermediate of its length forming a pair of cylinder chambers each of said chambers having ports in its peripheral wall, said cylinder wall having longitudinal passages directly connecting a port of one cylinder chamber with a port of the adjacent cylinder chamber.

2. A variable speed hydraulic transmission as claimed in claim 1, in which the dividing wall is formed with transverse passages connecting the passages between the cylinder ports intermediate of its length, and valve means are arranged in said longitudinal passages to direct the fluid flow through the transverse passages to reverse the flow of fluid to the driven rotor.

3. A variable speed hydraulic transmission comprising an outer casing, a pair of parallel cylindrical bars extending transversely of said casing and having transverse portions cut-away intermediate of their length and forming valves, a cylinder slidably mounted on said bars within said outer casing and having fluid passages extending longitudinally of the walls thereof intersecting the cut-away portions of said bars, a wall dividing said cylinder intermediate of its length and forming within said cylinder a pair of cylinder chambers, each of said chambers having peripheral ports communicating with the ends of said longitudinal fluid passages, said dividing wall having transverse passages communicating with said longitudinal passages intermediate of their length and said transverse passages each having one end opening to the longitudinal passages opposite the valve portions of said cylindrical rods, means for rotating said valve rods in unison to divert the flow of fluid from and to one cylinder through the transverse passages to and from the other of said cylinder chambers, vane type rotors mounted in said cylinder chambers mounted on parallel but longitudinally offset axes, and means for sliding said cylinder on said parallel transverse bars.

4. A variable speed hydraulic transmission as claimed in claim 1 in which the dividing wall between the cylinder chambers is formed with a pair of diagonally crossing independent passages the adjacent ends of both of which communicate with opposite longitudinal passages intermediate of their length, a rotary valve arranged in each of said longitudinal passages controlling the flow of fluid therethrough to divert same through said diagonal passages.

5. A variable speed hydraulic transmission comprising an outer casing having end bosses, bearing bushings mounted in said bosses having bearings eccentrically arranged therein, the bearings in one bushing being offset longitudinally in relation to the bearing in the other bushing, a drive shaft mounted in one bearing, a driven shaft mounted in the other and offset bearing, a vane type rotor mounted on each of said shafts, a cylinder having a cylinder chamber enclosing each of said rotors, means supporting said cylinder for lateral movement transverse to the axes of said shafts within said outer casing, and means within said cylinder walls for directing the flow of fluid from the driving rotor to the driven rotor.

6. In a variable speed hydraulic transmission, an outer casing, driving and driven shafts journalled in bearings in said outer casing and having parallel but longitudinally offset axes, a cylinder mounted for adjustment within said outer casing in a direction transverse to the axes of said shafts, rotors mounted on said shafts within said cylinder and having radial vane slots, vanes slidably mounted in said slots and having recessed ends, and floating rings mounted at the ends of said vanes within said recesses and supporting said vanes with their outer edges in operating contact with the inner periphery of the cylinder.

ROBERT S. SEGSWORTH.